March 8, 1932.  R. P. ALLEN  1,848,814
IMAGE FORMING, TRANSMITTING, AND REPRODUCING APPARATUS
Filed Oct. 10, 1928
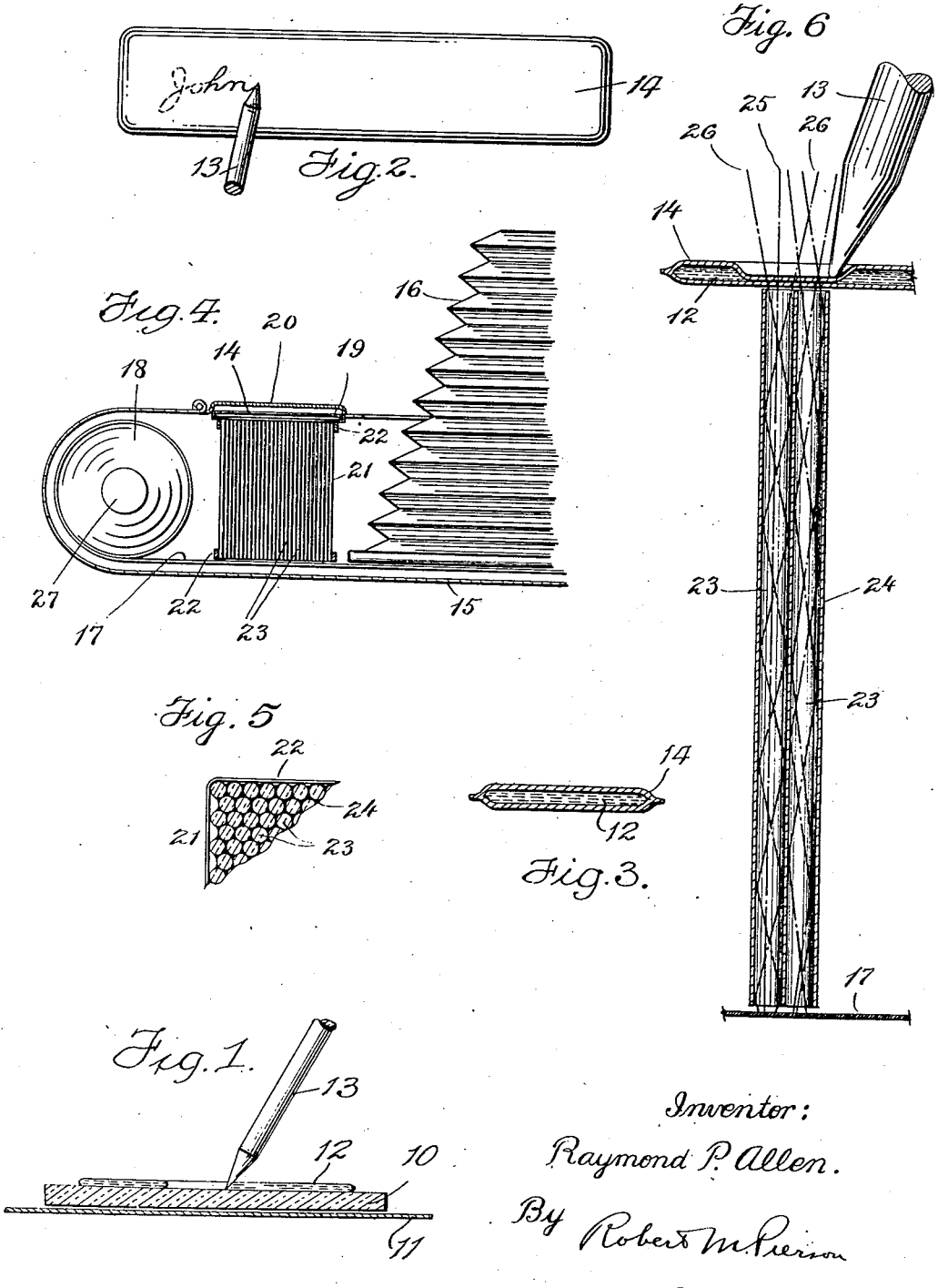
Inventor:
Raymond P. Allen.
By Robert M. Pierson
Attorney.

Patented Mar. 8, 1932

1,848,814

UNITED STATES PATENT OFFICE

RAYMOND P. ALLEN, OF AKRON, OHIO

IMAGE-FORMING, TRANSMITTING, AND REPRODUCING APPARATUS

Application filed October 10, 1928. Serial No. 311,647.

This invention relates to optical image-forming, transmitting and reproducing apparatus and parts thereof, and has for its object to provide novel means for producing an image traced by a stylus, for transmitting such an image in a legible form, or transmitting the components of an image along controlled lines, and for visually reproducing the image either temporarily, as on a screen, or permanently on a light-sensitive surface such as a photographic plate or film.

One of the useful applications of the invention is in autographic cameras, where it provides for a record of handwriting, for identification, on the front of the negative instead of the back, thus permitting the use of the ordinary opaque backing sheet in a film roll instead of the special translucent sheet and wax-carbon paper heretofore required.

Of the accompanying drawings, Fig. 1 is an elevation, partly in section, showing a rudimentary form of apparatus for producing an image in accordance with my invention.

Fig. 2 is a plan view showing a practical form of the image-producing envelope and stylus.

Fig. 3 is an enlarged transverse section of said envelope and liquid contents.

Fig. 4 is a partial longitudinal section showing a photographic camera equipped with my improvements.

Fig. 5 is an enlarged cross-section showing part of the image-transmitting means.

Fig. 6 is a much enlarged elevation and section of part of the apparatus shown in Fig. 4.

Referring first to Fig. 1, which shows the invention in a rudimentary form, 10 is a transparent sheet or plate which might be of glass or nitrocellulose and should be as thin as consistent with the strength of the material in order to minimize lateral diffusion of the light image transmitted through it. 11 is a sheet such as a photographic film or plate coated with a light-sensitive material, placed immediately beneath the transparent plate 10. 12 is a thin, opaque body of film thickness on top of the plate 10, made of a liquid whose viscosity is such that it will flow slowly, a suitable composition being water mixed with whiting or similar pigment and rendered opaque by means of carbon black or the like. By the use of a pointed stylus 13 the film 12 is parted to let the light through and produce an image of handwriting or other tracing which will be transmitted through the plate 10 and recorded on the photographic surface 11, the record being made permanent by the usual developing process.

The image-producing device in a more practical form is shown in Figs. 2 and 3, where 12 is the opaque, viscous film about 1 millimeter thick, enclosed in a shallow envelope 14 whose walls are substantially transparent and whose upper wall should be sufficiently thin and flexible to receive the impression of the stylus 13 and part the film 12 between the upper and lower walls in a narrow transparent line to produce the image of the writing traced by the stylus, so that light may pass through the envelope along the line thus traced. This image will endure long enough to be visually reproduced on a screen or on a light-sensitive surface, and is then automatically effaced as indicated by the broken line portion of the signature "John" in Fig. 2, through the natural flow and reuniting of the parted film 12 after the stylus has passed on.

In Fig. 4 I have shown a part of a film-roll camera provided with the described image-producing apparatus, and a further device of a novel character for transmitting the light image through the camera to the photographic film at the back. 15 is the casing of the camera and 16 the bellows forming part of the exposure means for taking a picture. 17 is an ordinary photographic film which unwinds from a let-off roll 18 on the spool 27 and is interwound with the usual backing strip or sheet of opaque paper. A sufficient space is left in the casing 15 between the roll 18 and the bellows 16 for making an autographic record on the front of the film, and over this space I make a window aperture 19 in the front wall of the casing which is covered, with a transparent-walled, flexible envelope 14 containing an opaque viscous liquid as described in connection with Figs. 2 and 3. This opening is normally closed by a hinged door 20 which may be opened when it is desired to write on the envelope.

Between the envelope 14 and the light-sensitive film 17 is mounted an image-transmitter 21 of approximately the same length and breadth as said envelope, confined by suitable metallic frames 22. Said image-transmitter consists of a large number of parallel, transparent, closely-packed, vertical rods 23 of material having a high light-transmitting capacity such as quartz or a suitable quartz glass of the type sold under the name of "Pyrex." Single rods of this character have the known capacity of transmitting light beams lengthwise thereof with very little loss, a large number of the slanting rays being totally reflected from the sides of the rod. By employing a numerous grouping of such rods of small diameter, preferably not greater than one to two millimeter or thereabouts, the smaller the better, I provide a collective, multiple light conduit through which an image of handwriting or the like extending over the ends of a plurality of these rods may be effectively transmitted from one end to the other end of the group. The rods 23 are preferably embedded, except at their ends, in an opaque binder 24 consisting of black paint or the like which serves to hold them together and acts as a coating on the individual rods to prevent diffusion of light transversely of the rods. Any binder material of a different refractive index than the rods will answer for this purpose. In Fig. 6 I have shown on an enlarged scale two of the quartz-glass rods 23 embedded in the opaque binder, together with the photographic film 17, the image-producing film 12 of opaque, viscous liquid enclosed in a flexible transparent envelope 14, and the stylus 13 in the act of tracing an image across the upper ends of the rods, this view illustrating the direct transmission of a straight light-ray 25 through one of the rods and the transmission of slanting rays 26 through the rods, accompanied by total reflection from their sides, the collective effect being a rectified transmission of the components of the image.

Thus I provide, in an autographic camera, a means of recording handwriting on the photographic film or plate, from the front side instead of the back, for identification of the negatives. This makes it possible to employ an ordinary plate of suitable length or an ordinary film roll interwound with opaque backing paper instead of the special film having two backings, one of translucent paper and one of wax-carbon paper, heretofore required in cameras of this class.

In the arrangement shown in Fig. 1, the stylus 13 could be of vitreous material such as quartz-glass to act as a light-transmitting and total-reflection conduit like the individual rods of Figs. 4, 5 and 6, and could have its sides covered with an opaque coating. This embodiment is not wholly limited to a thin viscous liquid body for tracing a persistent line.

The novel elements and sub-combination of my invention may be employed in any relation where they are capable of serving a useful purpose, and may be combined with other devices. Thus, the light-rays forming the image, having been confined substantially to a multiplicity of single paths by the rods 23, may afterwards be spread, concentrated or bent by lenses, prisms etc. in ways known to the optical arts, and projected on a screen or otherwise treated. The light approaching the viscous, opaque film may be produced, directed or treated as desired. The particulars of construction and arrangement above described are subject to variation. It is not essential that the rods 23 shall be of the precise shape shown, and they need not in all cases be straight or parallel-sided. It is not intended to confine the invention otherwise than is required by the prior art and the scope of the appended claims.

I claim:

1. Optical apparatus comprising means for supporting an image-receiving surface, and a body of opaque, semi-fluent liquid mounted in light-transmitting relation to the surface supported by said means and adapted to be parted by a stylus to admit light to said surface.

2. Optical apparatus comprising means for supporting an image-receiving surface, and an opaque, mobile, self-closing viscous film mounted in light-transmitting relation to the surface supported by said means and adapted to be parted by a stylus to admit a tracing of light to said surface.

3. Photographic apparatus comprising means for supporting a light-sensitive surface, and an opaque, viscous liquid film mounted in light-transmitting relation to the surface supported by said means and adapted to be parted by a stylus to trace a light-image on said surface.

4. Photographic apparatus comprising a solid light-transmitting medium, an opaque, viscous, liquid film on one side thereof, and means for supporting a light-sensitive surface on the other side.

5. Photographic apparatus comprising a vitreous light-transmitting medium, an opaque, viscous liquid film on one side thereof, and means for supporting a light-sensitive surface on the other side.

6. An optical device comprising a film of opaque, viscous liquid, and a light-transmitting envelope enclosing the same and having a flexible wall.

7. An optical device comprising an opaque, viscous liquid film, and a shallow, flat envelope of nitrocellulose enclosing the same and having a thin, flexible wall.

8. Optical apparatus comprising a group of light-transmitting rods, and means for producing a tracing of light over one end of said group.

9. Optical apparatus comprising a group of light-transmitting rods, and an opaque, viscous film placed over one end of said group and adapted to be parted by a stylus to produce a tracing of light for transmission through said rods.

10. Photographic apparatus comprising a group of light-transmitting rods, means for producing a light-image over one end of said group, and means for supporting a light-sensitive surface under the other end of said group.

11. In an autographic camera, the combination of a casing having a window in its front wall, means for supporting a light-sensitive surface adjacent the back wall of said casing, an opaque, viscous film in said window wherein a light-image may be traced by a stylus, and means in said casing for transmitting the image to the front side of the sensitive surface.

12. In an autographic camera, the combination of a casing having a window, means for supporting a light-sensitive surface with a portion exposable through said window, a light-transmitting envelope in said window having a flexible outer wall, an opaque, viscous film in said envelope, and a group of transparent rods interposed between said envelope and the place occupied by said portion of said light-sensitive surface.

In witness whereof I have hereunto set my hand this 6th day of October, 1928.

RAYMOND P. ALLEN.